(12) United States Patent
Ginja et al.

(10) Patent No.: US 10,843,391 B2
(45) Date of Patent: Nov. 24, 2020

(54) PROCESS FOR OVERMOULDING OVER A PLASTIC INSERT AND AUTOMOBILE PART OBTAINED BY THIS PROCESS

(71) Applicant: COMPAGNIE PLASTIC OMNIUM, Lyons (FR)

(72) Inventors: Stephane Ginja, Amberieu en Bugey (FR); Anthony Chene, Jujurieux (FR); Frederic Viot, Poncin (FR); Marine Bernard, Jujurieux (FR); Elise Dubost, Villeurbanne (FR)

(73) Assignee: Compagnie Plastic Omnium, Lyons (FR)

( * ) Notice: Subject to any disclaimer, the term of this patent is extended or adjusted under 35 U.S.C. 154(b) by 166 days.

(21) Appl. No.: 15/529,331

(22) PCT Filed: Nov. 23, 2015

(86) PCT No.: PCT/FR2015/053167
§ 371 (c)(1),
(2) Date: May 24, 2017

(87) PCT Pub. No.: WO2016/083712
PCT Pub. Date: Jun. 2, 2016

(65) Prior Publication Data
US 2017/0274568 A1    Sep. 28, 2017

(30) Foreign Application Priority Data

Nov. 25, 2014  (FR) ..................................... 14 61409

(51) Int. Cl.
B29C 45/14    (2006.01)
B32B 27/08    (2006.01)
(Continued)

(52) U.S. Cl.
CPC ........ B29C 45/14311 (2013.01); B29C 45/14 (2013.01); B32B 27/08 (2013.01);
(Continued)

(58) Field of Classification Search
CPC ... B29C 45/14311; B29C 45/14; B32B 27/34; B32B 27/08; B32B 27/32;
(Continued)

(56) References Cited

U.S. PATENT DOCUMENTS 8,071,220 B2    12/2011  Abraham et al. .......... 428/476.3
2012/0027983 A1    2/2012  Elia ................................. 428/74
(Continued)

FOREIGN PATENT DOCUMENTS

EP    1 313 780 B1    5/2003
EP    2 636 523 A1    9/2013
(Continued)

OTHER PUBLICATIONS

G. Nam et al., "Study of Maleic Anhydride Grafted Polypropylene Effect on Resin Impregnated Bamboo Fiber Polypropylene Composite", Agricultural Sciences, vol. 5, No. 13, pp. 1322-1328 (2014).
(Continued)

Primary Examiner — Joseph S Del Sole
Assistant Examiner — Mohamed K Ahmed Ali
(74) Attorney, Agent, or Firm — Venable LLP

(57) ABSTRACT

A process for manufacturing a composite automobile part by overmoulding, over at least one surface of an insert (1) comprising a first plastic material, a layer of a second thermoplastic material, comprises the following successive steps: a) a step of positioning said insert (1) in a mould, and b) a step of moulding said second thermoplastic material over said insert. At least one of said first and second materials comprises an additive, said additive comprising a polymer to which carboxylic anhydride monomers are
(Continued)

grafted. Said first and second materials are respectively based on polyamide and based on polypropylene, or vice versa and said second material comprises talc as mineral filler.

14 Claims, 1 Drawing Sheet

(51) Int. Cl.
    *B32B 27/32*     (2006.01)
    *B32B 27/34*     (2006.01)
    *B29K 105/00*     (2006.01)
    *B29K 23/00*     (2006.01)
    *B29K 509/00*     (2006.01)
    *B29K 677/00*     (2006.01)

(52) U.S. Cl.
    CPC .............. *B32B 27/32* (2013.01); *B32B 27/34* (2013.01); *B29K 2023/12* (2013.01); *B29K 2105/0005* (2013.01); *B29K 2509/00* (2013.01); *B29K 2677/00* (2013.01)

(58) Field of Classification Search
    CPC ........ B29K 2023/12; B29K 2105/0005; B29K 2509/00; B29K 2677/00
    See application file for complete search history.

(56) References Cited

U.S. PATENT DOCUMENTS

2013/0264741 A1    10/2013    Ookura et al. ................ 264/259
2014/0106103 A1    4/2014    Arakawa et al. ............ 428/36.8
2014/0113745 A1*   4/2014    Sullivan ............... A63B 37/006
                                                            473/372

FOREIGN PATENT DOCUMENTS

| EP | 2 724 860 A1 | 4/2014 | |
|---|---|---|---|
| JP | 7-299840 A | 11/1995 | |
| JP | 2001-162648 A | 6/2001 | |
| JP | 3377010 B2 * | 2/2003 | ............. B29C 45/16 |
| JP | 3377010 B2 | 2/2003 | |
| WO | 2011/138384 A1 | 11/2011 | |
| WO | 2014/013871 A1 | 1/2014 | |

OTHER PUBLICATIONS

V. Goodship et al., "Multi-Material Injection Moulding", Rapra Review Reports, vol. 13, No. 1 pp. 66, Item 177 (2002).
"Dupont (TM) Fusabond Functionalized Polymers/Resin Modifiers: list, descriptions and data sheets", Oct. 3, 2014, URL:https://web.archive.org/web/20141003164325/http://www2.dupont.com/Fusabond/en_US (retrieved May 28, 2015).
"Technical Bulletin 1301 New Markets for Talc-Filled Polymers Introduction", Apr. 18, 2013, URL:http://web.archive.org/web/20130418092230/http://www.mondominerals.com/uploads/media/mondo_bulletin_plasticspdf (retrieved Feb, 17, 2016).
Notice of Allowance dated Sep. 4, 2019, issued in counterpart CN Application No. 201580063170.7 (6 pages).
International Search Report dated Feb. 17, 2016, in corresponding PCT/FR20151053167 (8 pages).

* cited by examiner

PROCESS FOR OVERMOULDING OVER A PLASTIC INSERT AND AUTOMOBILE PART OBTAINED BY THIS PROCESS

FIELD OF THE INVENTION

This invention relates to the manufacture of automobile parts made of material based on one or more (thermo)plastic compounds. It relates in particular to a process for manufacturing automobile parts and more particularly bodywork parts.

BACKGROUND OF THE INVENTION

A motor vehicle may comprise numerous plastic parts generally made by an injection moulding process and which comprise one or more inserts. These inserts are preformed parts incorporated in, and/or integral with, said moulded part which are generally used for reinforcement of said moulded part and/or subsequent attachment of mechanical components. These inserts may be made of steel, aluminium or composite plastic materials. The parts obtained may be structural or semi-structural parts of the motor vehicle concerned. Thus, overmoulding of the parts is not obtained by simultaneous injection of the insert and of the layer incorporating it. However overmoulding can be carried out by successive injections. Overmoulding can also be obtained by using separate moulds, each having a cavity, or a single mould with rotating mobile section (mould with rotating cavities) which comprises at least two separate cavities and which can be used to produce in a single injection both an overmoulded part and an insert.

Obviously, it is very important for the quality of the parts produced to ensure good attachment between the insert and the plastic material incorporating it or to which it is attached, material usually known as "overmoulding material" due to the manufacturing technique most frequently used. The attachment may be a mechanical connection. For example, if the insert is drilled, the overmoulded material flows into the hole and creates a rivet type connection.

This attachment may be an adhesion of surfaces placed in contact. For example, chemical binders such as resins or adhesives may be applied in particular on the contact surfaces of the insert. For example, the patent filed by DUPONT published under number EP1313780B1 describes a polypropylene material to which maleic anhydride (AM) molecules are grafted. This material cannot be used as overmoulding material as such due to its rheological characteristics which prevent it from being injected directly on an injection press. In addition, its mechanical characteristics are too low to produce a structural or semi-structural part.

These mechanical or chemical attachment methods are often weak points of the composite part, in particular during the stress created by impacts in case of automobile parts.

Adhesion can also be carried out by a chemical reaction process between the materials of the insert and of the overmoulding. In this case, satisfactory adhesion can only be obtained between an insert and a compatible overmoulding material, i.e. one of the same chemical type (PP/PP, PA/PA) and/or by melting the materials. Thus, the manufacture of composite parts comprising one or more inserts involves either additional steps (for example heating, bonding, drilling, surface treatment) or a limitation in the choices and possible (compatible) combinations regarding the types of the materials forming the insert and the overmoulding material.

SUMMARY OF THE INVENTION

The invention aims to remedy one or more of these disadvantages by providing in particular a process for manufacturing a composite part by overmoulding over a plastic insert. According to one embodiment of the invention, said process relates to the manufacture of a composite automobile part by overmoulding, over at least one surface of an insert comprising a first plastic material, a layer of a second thermoplastic material, said process comprising the following successive steps:
  a) a step of positioning said insert in a mould, and
  b) a step of moulding, preferably by injection, said second thermoplastic material over said insert;
  at least one of said first and second materials comprising an additive, said additive comprising a polymer to which carboxylic anhydride monomers are grafted.

DETAILED DESCRIPTION

It is thus possible to produce composite parts between materials of different types, not chemically compatible and with an insert whose material is not remelted (deformable). This process can be used to combine the step of adhesion between the insert and the overmoulding material with the step of forming said composite part by moulding. Thus, the composite part can be produced in one overmoulding operation by injection or by compression. Furthermore, the process according to the invention provides a means of better adapting the overmoulding material (or "second material") to the desired requirements for the automobile part such as its Young's modulus (for example by varying the filler type or content) and/or the impact resistance (for example by varying the elastomer content) and/or its rheological behaviour (for example by choosing the type or grade of the plastic matrix). Thus, according to a preferred aspect of the invention, the first material and the second material are materials of different type, preferably not likely to adhere to each other satisfactorily when subjected to typical injection moulding pressure and temperature conditions. Satisfactory adhesion can be defined by the international standard ASTM D5868.

Advantageously, said first and second materials are respectively based on polyamide and based on polypropylene, or vice versa.

The overmoulding material is a plastic material. Preferably, this material is selected so that it can be injection moulded. Thus, it may advantageously be based on a polyolefin selected from the group consisting of polypropylene (PP), high or low density polyethylene (PE) and/or copolymers of propylene and ethylene. These materials may be virgin or recycled.

The expression "based on" designates a material comprising at least 50% by weight of the compound identified after this expression. Preferably, the plastic material comprises at least 60% of polypropylene, more particularly at least 70% and preferably at least 80% by weight of the olefin compared with the total weight of the overmoulding material.

The additive which is included in the first and/or second material further comprises at least one, and preferably several (for example two), additives. This additive is selected from the group consisting of polymers to which monomers of carboxylic anhydrides and more particularly of maleic anhydride and its derivatives are grafted. The polymer may be a polymer of type or structure similar or identical to the polymer forming the base of the material to which it is added. Advantageously, these polymers are selected from the group consisting of polypropylene, high or low density polyethylene (PE), copolymers of propylene and ethylene, and/or a thermoplastic elastomer based on styrene-block-copolymers (TPS) such as styrene ethylene butadiene styrene (SEBS) (polystyrene-b-poly(ethylene-butylene)-b-polystyrene). The percentage by weight of maleic acid monomer compared with the total weight of the additive may range from 0.5% to 10%.

Preferably, the additive(s) is/are present in proportions ranging from 0.1% to 25%, advantageously from 2% to 25%, more particularly from 0.1% to 20%, for example 2% to 20% by weight compared with the total weight of said material. Advantageously, this proportion is about 10%±2% by weight.

When the additive comprises SEBS, it may advantageously be present in proportions ranging from 0.1% to 10% by weight compared with the total weight of the material.

When the additive comprises grafted PP, it may advantageously be present in proportions ranging from 2% to 25% by weight compared with the total weight of the material.

According to a particularly preferred embodiment of the invention, the additive comprises or consists of a mixture of SEBS and PP grafted with maleic acid monomers. The relative proportions of these components compared with the total weight of the material may be about 0.1% and 15% by weight respectively.

According to a preferred embodiment, the second material (or overmoulding material) comprises the additive.

Preferably, the overmoulding material comprises a mineral or organic filler, for example, quartz, mica, kaolin, calcium phosphate, feldspar, steatite, chalk, talc, carbon black, synthetic silica, barium sulphate, barium ferrite, wood or fruit bark flour, cellulose pulp, glass fibres, carbon fibres, widely used hollow glass microspheres, synthetic silica, nanoclay, flax, etc. and mixtures thereof.

This filler may vary from 1% to 49.9% by weight depending on the type of filler, for example from 3% to 30%, more particularly from 1% to 40% by weight compared with the weight of the overmoulding material. Preferably, this filler, by weight, may vary from 5% to 40%, preferably from 5% to 30%, for example 10% and preferably 12% compared with the total weight of the overmoulding material.

Preferably, the filler comprises a mineral filler, in particular talc.

It is also advantageous that the overmoulding material should comprise an elastomer material, for example a copolymer of type EPR (ethylene propylene rubber) which may be present in a proportion ranging from 5% to 35% by weight compared with the total weight of the overmoulding material. The quantity of ethylene propylene rubber is advantageously 5% to 15%, preferably 10% by weight compared with the total weight of the plastic.

The overmoulding material may also comprise a colorant such as carbon black for example in proportions of 0.5% by weight.

The second material (or overmoulding material) may therefore comprise, or consist of, a propylene/ethylene copolymer and/or an elastomer, and/or a mineral filler such as talc. Advantageously, said overmoulding material comprises, or consists of, a mixture of polypropylene, polyethylene, talc and ethylene propylene rubber and additive. The quantity of polypropylene in the overmoulding material is advantageously at least 50% by weight compared with the total weight of said material. The quantity of ethylene propylene rubber is advantageously from 5% to 15%, preferably 10% by weight compared with the total weight of the plastic.

Preferably, the overmoulding layer of said composite part consists of a polymer comprising, or consisting of, a P/E copolymer based on propylene and polyethylene comprising 12% by weight of talc and 10% by weight of an EPR type elastomer material, from 0.2% to 0.5% by weight of SEBS and from 5% to 10% by weight of polypropylene grafted with maleic anhydride monomers.

Preferably, the insert and/or the overmoulding material comprises substantially no metal ions. For example, it comprises less than 3% of carboxylic acid functions neutralised by one or more metal ions.

Preferably, the overmoulding material can be manufactured by a standard extrusion process where the basic polymer is softened or liquefied and then mixed with the other components in predetermined proportions before being extruded and optionally subjected to a granulation step to obtain solid granules. Advantageously, these granules can be used directly during the manufacture of the composite part. Alternatively, the overmoulding material can also be obtained when moulding the composite part by adding and mixing its various components in the required proportions in the screw of the moulding device injection press.

The insert is a part which preferably comprises a plastic material, advantageously based on polyamides such as polycaprolactams: [NH—(CH2)5-CO]n (PA-6) and polyhexamethylene adipamides: [NH—(CH2)6-NH—CO—(CH2)4-CO]n (PA-6,6). The plastic material (or first material) forming all or some of the insert may also be based on polypropylene and/or polyethylene. This part may comprise an organic or mineral filler as described previously.

When the insert has a structural, semi-structural or reinforcement function, the filler may comprise, or consist of, a material providing this function, such as glass fibres or carbon fibres. The proportions of this filler may vary from 10% to 95%, preferably from 15% to 90%, advantageously from 20% to 85%, and more particularly from 75% to 85% by weight compared with the total weight of the insert material so reinforced. As mentioned previously, the insert may have multiple shapes and functions. It may, according to a particular embodiment, be the rigid section of a beam intended to be placed behind a motor vehicle bumper. This type of beam is used to support the bumper and withstand deformation during an impact. The beam therefore generally comprises a rigid section (insert) and a more flexible section (mouldable material). The rigid section provides support and limits deformation during impacts at high speed. The more flexible section is more particularly intended to absorb impacts at low speed. Traditionally, the rigid section will be positioned at the front, i.e. in contact with the bumper, and the flexible section will be positioned between the rigid section and the steel body of the car.

During the step of positioning the insert according to the process of the invention, the insert is not molten and/or is at ambient temperature and/or is not subjected to preheating.

Advantageously, the insert is not heated or is heated to a temperature below the melting point of said first material. For example, the temperature of the PA insert loaded with glass fibres when it is being positioned in the mould is ambient temperature or may reach 180° C., for example range from 50° C. to 180° C. Heating can be obtained through the use of infrared lamps.

To further improve the adhesion between the outer surface of the insert and the overmoulding material, one or more preliminary steps of treating the surface by chemical or mechanical means can be carried out.

An example of chemical surface treatment used to increase adhesion is flaming, in which the treated surface is subjected to the application of a flame. This flaming step is known in the technical field of the invention and can be carried out using a natural gas torch under conditions which are slightly oxidising or not.

An example of physical treatment of the surface of the insert which may be carried out to increase adhesion is application of a sanding or sandblasting step.

The invention also relates to a composite part, in particular a part of a motor vehicle, comprising an insert, said insert comprising, or consisting of a first plastic material and a layer of a second thermoplastic material, characterised in that at least one of said first and second materials comprises an additive, said additive comprising a polymer to which carboxylic anhydride monomers are grafted. The materials forming said composite part and their respective proportions may be as described in this application. According to a preferred embodiment, said composite part comprises a surface of adhesion between the insert and the second material, this surface comprising substantially no materials other than the component materials of the first and second materials. The composite part according to the invention may take all shapes, in particular the shapes of parts used in the manufacture of motor vehicles. Preferably, the part is a structural or semi-structural part, such as a beam (for example a bumper beam).

The invention also relates to a composite part, in particular a part of a motor vehicle, obtained directly by the process of the invention, as well as to a motor vehicle comprising said part.

Another object of the invention is a plastic, preferably thermoplastic, composition comprising a polymer and a grafted additive and as described in this application. This composition is preferably injectable and intended for use in an injection moulding process, in particular for the manufacture of motor vehicle parts.

Yet another object of the invention is the use of said plastic composition in the manufacture of composite parts, in particular composite parts of motor vehicles.

BRIEF DESCRIPTION OF THE FIGURE

The invention will be better understood on reading the accompanying FIGURE, which is given solely by way of example and not limiting in any way, in which.

EXAMPLES OF EMBODIMENT

Figure 1:
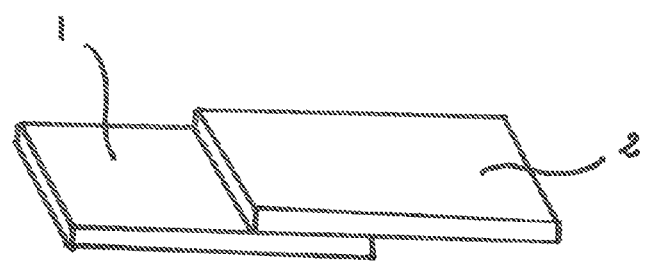
FIG. 1 is a diagram representing the respective positions of the specimens used to test the adhesion of the materials of a composite part according to the invention.

An Overmoulding Material According to the Invention is Made as Follows:

Granules of a propylene/ethylene copolymer, of respective proportions P/E 80/20, are poured into the input hopper of a standard twin-screw extruder. The extruder can be used to add compounds about one third of the way along the extrusion path when the initial polymer has melted. Thus, the following are added:

12% by weight of talc;
10% by weight of EPR (PP 108MF10 sold by Saudi Basic Industries Corporation (SABIC), Le Monge-22 Place des Vosges, La Défense 5, 92979 Paris La Defense cedex, France);
0.2% by weight of SEBS grafted with maleic anhydride (type KRATON FG 1901G); and
10% by weight of PP grafted with AM of type Orevac CA 100.

Kraton FG type polymers are polymers grafted by adding maleic anhydride. The grafting rate of these polymers is about 1.0% to 1.7% by weight. These polymers are sold by Kraton Performance Polymer Inc, 15710 John F Kennedy Blvd, Houston, Tex. 77032, USA.

The polymer OREVAC® CA100 is a highly functionalised polymer with a high proportion of maleic anhydride sold by ARKEMA, Immeuble Défense Ouest 420, rue d'Estienne d'Orves 92705 COLOMBES Cedex, France.

The granules obtained after granulation at the extruder output (temperature about 220° C.) therefore contain the above-mentioned percentages.

Manufacture of a Composite Part According to the Invention:

A composite beam intended to be positioned behind a motor vehicle bumper is manufactured.

A part, or beam, made of polyamide PA-6 PA is produced by pultrusion. It contains 80% by weight of glass fibres. This insert is heated to 150° C. on the surface and is placed in a standard injection mould used for the manufacture of automobile parts.

The overmoulding material described above is poured into the hopper to supply the plasticising screw (worm screw type). It is heated and temperature-controlled by the plasticising barrel at 250° C. to change to molten state (deformable).

The material moves to the front of the plasticising screw to be metered and injected at high pressure inside the mould which has the shape of the required part. This material is injected directly onto the surfaces of the insert exposed by the mould. The mould temperature is controlled at a temperature below the transformation temperature, i.e. at about 40° C. to 50° C. The pressure is maintained for 10 to 20 seconds (in this case 10 seconds) to compensate for shrinkage of the material during cooling. The part is cooled for a few seconds and then ejected.

The composite beam is thus obtained directly at the output of the injection mould and comprises a more rigid section (the insert) and a more flexible section which is attached directly to the insert by overmoulding. The adhesion of these two components together meets the required criteria. For example, the adhesion is considered satisfactory when there is no decohesion between the overmoulded beam and the overmoulding material after impact tests.

A protocol which can be applied to ensure cohesion of the composite part is application on specimens (tabs) of an international standard lap shear test such as that of standard ASTM D5868. The test specimens are made of the same materials as those of the composite parts. The shapes of the parts used are shown in FIG. 1.

Thus, rectangular PA bars (1) of dimensions 125×25 mm and thickness 2 mm comprising a proportion of 83% glass fibres by weight are introduced into a mould. A plastic composition according to the invention comprising a polymer grafted with maleic anhydride is injected. A 200 T press is used and the moulding temperature is 80° C. The overmoulded part is a rectangular bar (2) of the same dimensions 125×25 mm as the bar (1) but of thickness 3 mm. Overmoulding only covers one of the surfaces of the bars and is as shown on the diagram of FIG. 1. The coverage area is 25×25 mm. The tensile characteristics of these specimens are then measured (using a tensile testing machine) at a speed of 13 mm/min. The stress must be greater than 1 MPa. The test must be repeated successfully at least 5 times.

The invention is not limited to the embodiments described and other embodiments will be clearly apparent to those skilled in the art. In particular, other plastic materials can be used to make the insert or the injectable material, possibly with the materials described above. This material may be selected from the thermosetting materials based on, or comprising, polyester, epoxy or vinyl ester (VE). This material may also be selected from polyolefins, for example from the group consisting of acrylonitrile butadiene styrene (ABS), polyamides such as polycaprolactams: [NH—(CH2) 5-CO]n (PA-6) and polyhexamethylene adipamides: [NH—(CH2)6-NH—CO—(CH2)4-CO]n (PA-6,6), polycarbonates (PC), high density polyethylenes (HDPE), low density polyethylenes (LDPE), amorphous or crystalline poly(ethylene terephthalates) (PET), poly(methyl methacrylates) (PMMA), polypropylenes (PP), "crystal" polystyrenes (PS), rigid polyvinyl chloride (PVC) and mixtures thereof. Compression moulding may also be used instead of injection moulding. This alternative uses a prepreg material such as a fabric preimpregnated with resin (also called matrix) which is applied over the insert and moulded.

What is claimed is:

1. A process for manufacturing a composite automobile part comprising the following successive steps:
   (a) positioning an insert in a mould, said insert comprising a first plastic material; and
   (b) overmoulding a layer of a second thermoplastic material over at least one surface of said insert to obtain the composite automobile part,
   wherein at least one of said first plastic material and said second thermoplastic material comprises an additive, said additive comprising a polymer to which carboxylic anhydride monomers are grafted;
   wherein said first plastic material and said second thermoplastic material are respectively based on polyamide and based on polypropylene, or vice versa; and
   wherein said second thermoplastic material is made of a polymer comprising a propylene/ethylene copolymer based on propylene and polyethylene comprising 12% by weight of talc as mineral filler and 10% by weight of an EPR type elastomer material, from 0.2% to 0.5% by weight of SEBS and from 5% to 10% by weight of polypropylene grafted with maleic anhydride monomers.

2. The process according to claim 1, wherein said moulding step is an injection moulding step.

3. The process according to claim 1, wherein said additive is maleic anhydride, a derivative of maleic anhydride, or a combination thereof.

4. The process according to claim 1, wherein said polymer to which carboxylic anhydride monomers are grafted is selected from the group consisting of polypropylene, high or low density polyethylene, copolymers of propylene and ethylene, a thermoplastic elastomer based on styrene-block-copolymers and combinations thereof.

5. The process according to claim 1, wherein said second thermoplastic material comprises said additive.

6. The process according to claim 1, wherein said first plastic material or said second thermoplastic material further comprises another additive comprising a thermoplastic polymer to which carboxylic anhydride monomers are grafted.

7. The process according to claim 1, wherein said first plastic material and said second thermoplastic material are materials of different type.

8. The process according to claim 1, wherein the second thermoplastic material comprises a propylene/ethylene copolymer, an elastomer, or a combination thereof.

9. The process according to claim 1, wherein during the positioning step, the insert is not in a molten state, is at ambient temperature, or both is not in a molten state and is at ambient temperature.

10. The process according to claim 3, wherein said maleic anhydride, the derivative of maleic anhydride or the combination thereof is present in a proportion ranging from 0.1% to 20% by weight compared with the total weight of said first plastic material, said second thermoplastic material, or combination thereof.

11. The process according to claim 10, wherein said maleic anhydride-, the derivative of maleic anhydride or the combination thereof is present in a proportion ranging from 2% to 20% by weight compared with the total weight of said first plastic material, said second thermoplastic material, or combination thereof.

12. The process according to claim 4, wherein the polymer is (polystyrene-b-poly(ethylene-butylene)-b-polystyrene.

13. The process according to claim 7, wherein said first plastic material and said second thermoplastic material are materials not likely to adhere to each other satisfactorily when subjected to typical injection moulding pressure and temperature conditions.

14. The process according to claim 1, wherein said second thermoplastic material is made of a polymer consisting of a propylene/ethylene copolymer based on propylene and polyethylene comprising 12% by weight of talc and 10% by weight of an EPR type elastomer material, from 0.2% to 0.5% by weight of SEBS and from 5% to 10% by weight of polypropylene grafted with maleic anhydride monomers.

* * * * *